United States Patent
Knight et al.

(10) Patent No.: US 7,053,763 B2
(45) Date of Patent: May 30, 2006

(54) SYSTEM AND METHOD FOR ALARM MONITORING

(75) Inventors: Clifford Lee Knight, Cape Coral, FL (US); Glen Patrick Wark, Venice, FL (US)

(73) Assignee: Cingular Wireless II, LLC, Atlanta, GA (US)

( * ) Notice: Subject to any disclaimer, the term of this patent is extended or adjusted under 35 U.S.C. 154(b) by 0 days.

(21) Appl. No.: 10/153,675

(22) Filed: May 24, 2002

(65) Prior Publication Data

US 2003/0218538 A1    Nov. 27, 2003

(51) Int. Cl.
*G08B 29/00*    (2006.01)

(52) U.S. Cl. .................. 340/506; 657/663; 455/560; 455/562.2

(58) Field of Classification Search ............... 340/531, 340/532, 539.1, 539.11, 506, 507, 657, 660; 455/422, 423, 424, 426.1, 560–561, 562.2; 330/124, 96, 207
See application file for complete search history.

(56) References Cited

U.S. PATENT DOCUMENTS

| | | | | |
|---|---|---|---|---|
| 5,418,490 A | * | 5/1995 | Kaegebein | 330/124 D |
| 5,572,510 A | | 11/1996 | Koivu | 370/13 |
| 5,790,944 A | | 8/1998 | Karki et al. | 455/226.2 |
| 5,809,395 A | * | 9/1998 | Hamilton-Piercy et al. | 725/106 |
| 5,857,012 A | | 1/1999 | Paul | 379/34 |
| 5,923,247 A | | 7/1999 | Dowden et al. | 340/506 |
| 5,930,707 A | | 7/1999 | Vambaris et al. | 455/424 |
| 6,037,868 A | | 3/2000 | Oh et al. | 340/539 |
| 6,047,199 A | * | 4/2000 | DeMarco | 455/572 |
| 6,070,091 A | | 5/2000 | Hogevik | 455/561 |
| 6,094,577 A | | 7/2000 | Han | 455/424 |
| 6,141,546 A | | 10/2000 | Thomas et al. | 455/424 |
| 6,151,482 A | * | 11/2000 | Eriksson | 455/67.11 |
| 6,169,451 B1 | * | 1/2001 | Kim | 330/124 D |
| 6,188,876 B1 | | 2/2001 | Kim | 455/67.1 |
| 6,266,545 B1 | * | 7/2001 | Backman et al. | 455/572 |
| 6,269,255 B1 | * | 7/2001 | Waylett | 455/562.1 |
| 6,311,044 B1 | | 10/2001 | Wilde et al. | 455/73 |
| 6,321,081 B1 | | 11/2001 | Lee | 455/422 |
| 6,501,959 B1 | | 12/2002 | Seon | 455/522 |
| 6,583,763 B1 | * | 6/2003 | Judd | 343/701 |
| 6,587,686 B1 | | 7/2003 | Cuffaro et al. | 455/423 |
| 6,640,111 B1 | * | 10/2003 | Shapira | 455/562.1 |
| 6,834,182 B1 | * | 12/2004 | Fu | 455/115.1 |
| 2001/0006891 A1 | * | 7/2001 | Cho | 455/425 |

(Continued)

FOREIGN PATENT DOCUMENTS

EP    0 630 125 A2    12/1994

(Continued)

*Primary Examiner*—Thomas J. Mullen, Jr.
*Assistant Examiner*—Son Tang
(74) *Attorney, Agent, or Firm*—Moazzam & Associates, LLC

(57) ABSTRACT

A system providing an alarm indication for a base transceiver station comprising: a voltage actuated device for sensing power to a tower mounted amplifier (TMA); and an alarm board for sensing an alarm initiated from the voltage actuated device. A method provided for alarm indication for a based transceiver station comprising: triggering a voltage actuated device to provide an alarm upon a loss of power and providing the alarm from the voltage actuated device to an alarm board. A method provided for connecting an alarm for a power out linear amplifier comprising: connecting a voltage actuated device to a power out linear amplifier; connecting the voltage actuated device to an alarm board; connecting the alarm board to a mobile switching center; and connecting the mobile switching center to a diagnostic tool.

19 Claims, 5 Drawing Sheets

U.S. PATENT DOCUMENTS

| | | | |
|---|---|---|---|
| 2001/0044279 A1 | 11/2001 | Jeong | 455/67.7 |
| 2002/0115434 A1 | 8/2002 | Sasaki et al. | 455/424 |
| 2003/0064720 A1 | 4/2003 | Valins et al. | 455/423 |
| 2003/0114111 A1 | 6/2003 | Shepherd et al. | 455/67.1 |
| 2003/0162539 A1* | 8/2003 | Fiut et al. | 455/424 |

FOREIGN PATENT DOCUMENTS

| | | |
|---|---|---|
| GB | 2 256 776 A | 12/1992 |
| WO | WO 92/22963 | 12/1992 |

* cited by examiner

Method for Connecting an Alarm Indicator
for a POLNA Failure

SYSTEM AND METHOD FOR ALARM MONITORING

BACKGROUND OF THE INVENTION

1. Field of the Invention

The invention generally relates to alarm notification within telecommunication systems, and more particularly, to alarm notification for power out linear amplifiers (POLNA) in base transceiver stations.

2. Background of the Invention

In cellular communication systems, to increase the signal received from the mobile devices, tower mounted amplifiers are located within base transceiver stations. The tower mounted amplifiers increase the received signal by approximately 15 decibels (db); and, as a result of the increase in the received signal, the range of the base transceiver station is also increased.

The tower mounted amplifiers are powered from power out linear amplifiers, which also provide alarm indication for the tower mounted amplifiers. An electronic card in a power out linear amplifier provides a 15 volt output and includes a current sensing device that provides the alarm indication. When the current sensing device detects a current draw from the tower mounted amplifiers, which is above a predetermined threshold, it provides an alarm indication.

The current sensing device is designed to have an operating range of approximately 200–800 milliamps. When a tower mounted amplifier is operating normally it will maintain a current draw of approximately 200 milliamps and when it fails the current draw will be substantially higher, for example 1100 milliamps. The higher current draw triggers the alarm indication.

One of the problems with the current sensing devices is that they provide intermittent alarm indication. They do not always alarm upon tower amplifier failure. The current sensing device may not provide an alarm indication for failure conditions not associated with an increase in current draw. For example, when the electronic card in the power out linear amplifier fails, it does not provide the 15 volt output to the tower mounted amplifier. This condition does not provide any alarm indication; even though, the tower mounted amplifier is not operational. In many cases, the failure of the electronic card may be due to component failures caused by weather conditions, such as lightning.

Without the alarm indication from the current sensing device, the most likely method for detecting the failure is to conduct an analysis of the call processing performance of a base transceiver station. Then, because of a decreased number of processed calls, an investigation may be initiated and the non-operational tower mounted amplifier may be found.

When the electronic card in the power out linear amplifier fails and the tower mounted amplifier is not functioning properly, the signal received at the base transceiver station may be greatly degraded. For example, a two mile coverage radius around the base transceiver station may be reduced to a half or a quarter of a mile, when the electronic card in the power out linear amplifier fails and the tower mounted amplifier is not operating properly.

Therefore, to maintain an acceptable coverage radius for a base transceiver station, there is a need for a failure detection device for a power out linear amplifier, which provides a failure indication when the electronic card powering the tower mounted amplifier fails.

SUMMARY OF THE INVENTION

Methods and systems consistent with embodiments of the present invention overcome the deficiencies of failure detection devices used in conjunction with power out linear amplifiers, which power tower mounted amplifiers in a base transceiver station. The embodiments of the present invention comprise a voltage actuated device for sensing power to a tower mounted amplifier and an alarm board for sensing an alarm initiated from the voltage actuated device.

More particularly, the embodiments of the present invention comprise a voltage actuated device (e.g., a voltage relay), which upon a change of states provides an input to the alarm board. The alarm board, then in turn, provides an alarm input to a mobile switching center. Next, the alarm input is transferred from the mobile switching center to a diagnostic tool. In one embodiment, the diagnostic tool polls the mobile switching center to detect and transfer the alarm input.

In another embodiment of the present invention, a method is provided for communicating an alarm for a power out linear amplifier, which performs the steps of: triggering a voltage actuated device to provide an alarm upon a loss of power; and providing the alarm from the voltage actuated device to an alarm board.

More particularly, the method for communicating an alarm for a power out linear amplifier, may further comprise the steps of: triggering the alarm by initiating a change of state in the voltage actuated device to generate the alarm; providing the alarm from the voltage actuated device to an alarm board and providing the alarm from the alarm board to a mobile switching center; and providing the alarm from the mobile switching center to a diagnostic tool. The diagnostic tool provides the alarm to a system attendant via a pager, a PDA, and/or a telephone communication device.

In yet another embodiment of the present invention, a method is provided for connecting an alarm for a power out linear amplifier comprising the steps of: connecting a voltage actuated device between a power out linear amplifier and a duplexer; connecting the voltage actuated device to an alarm board; connecting the alarm board to a mobile switching center via a wireless communication link; and connecting the mobile switching center to a diagnostic tool via an electronic communication link, which allows the diagnostic tool to poll the mobile switching center.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
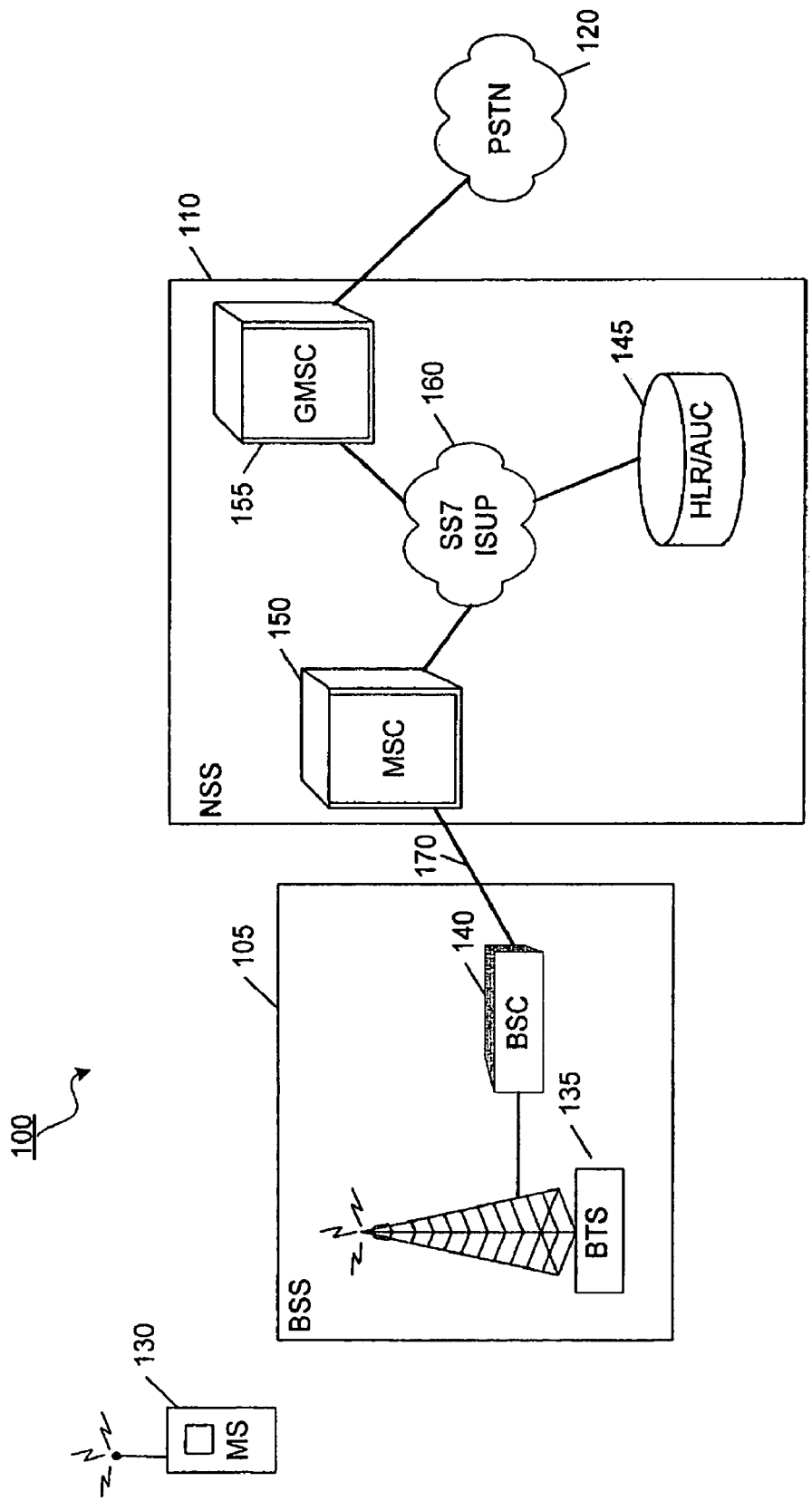
FIG. 1 is a diagram illustrating a wireless telecommunication system in which embodiments of the present invention may operate.

Reference will now be made to various embodiments according to this invention, examples of which are shown in the accompanying drawings and will be obvious from the description of the invention. In the drawings, the same reference numbers represent the same or similar elements in the different drawings whenever possible.

Consistent with the general principles of the present invention, a system provides an alarm indication for a base transceiver station in a wireless telecommunication system. The system may comprise a voltage actuated device that changes states and provides an alarm indication to an alarm input device; and a switch station that receives the alarm indication and transfers the alarm indication to a diagnostic tool within the telecommunication system. In turn, the diagnostic tool may communicate the alarm indication to a system attendant.

FIG. 1 illustrates a wireless telecommunication system 100 in which the present invention may operate. In order to provide a context for the present invention, a brief description of the pertinent components of telecommunication system 100 is provided below. Telecommunication system 100 may comprise a base station subsystem (BSS) 105, a network and switching subsystem (NSS) 110, and a mobile station (MS) 130.

Those of ordinary skill in the art will appreciate that Telecommunication System 100 may use Global Systems for Mobile Communications (GSM) technology or other wireless telecommunication technologies, for example, Frequency Division Multiple Access (FDMA), Time Division Multiple Access (TDMA), Coded Division Multiple Access (CDMA), Universal Mobile Telecommunications System (UMTS), Enhanced Data Rates for Global Evaluation (EDGE), and Code Division Multiple Access 2000 (CDMA2000). It may also be appreciated that wireless telecommunications may be transmitted using radio transmission via airwaves, infrared line of sight, cellular, microwave, satellite, blue-tooth, packet radio, and spread spectrum radio. Wireless data transmission may include, but is not limited to, paging, text messaging, e-mail, Internet access, instant messaging, and other specialized data applications specifically excluding or including voice transmission.

As shown in FIG. 1, BSS 105 may comprise, for example, a base station controller (BSC) 140 and a base transceiver station (BTS) 135. BSS 105 connects to MS 130 through a radio interface and connects to NSS 115 through an interface 170. BSC 140 controls BTS 135 and may control a plurality of other base transceiver stations in addition to BTS 135. BTS 135 may comprise radio transmission and reception equipment located at an antenna site.

MS 130 may comprise a mobile phone, a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information. MS 130 may utilize cellular telephone protocols such as wireless application protocol (WAP).

Still referring to FIG. 1, NSS 110 may comprise a mobile switching center (MSC) 150, a first network 160, a home location register/authentication center (HLR/AUC) 145, and a gateway mobile switching center (GMSC) 155. NSS 110 manages the communication between subscribers, for example, an operator using MS 130, and other telecommunications users, for example, those using publicly switched telephone network (PSTN) 120. PSTN 120 may comprise, for example, the worldwide voice telephone network.

MSC 150 coordinates call setup to and from subscribers such as an operator using MS 130. MSC 150 may control several base station controllers such as, and similar to BSC 140. GMSC 155 is used to interface with external networks for communication with users outside of the wireless system, such as users on PSTN 120.

HRL/AUC 145 may comprise a stand-alone computer without switching capabilities, a database which contains subscriber information, and information related to the subscriber's current location, but not the actual location of the subscriber. The AUC portion of HLR/AUC 145 manages the security data for subscriber authentication. Another subdivision of HLR/AUC 135 may include an equipment identity register (EIR) (not shown) which may store data relating to mobile equipment (ME).

NSS 110 may also include a visitor location register (VLR) (not shown). The VLR links to one or more mobile switching centers located on other systems, temporarily storing subscription data of subscribers currently served by MSC 150. The VLR holds more detailed data than HLR/AUC 145. For example, the VLR may hold more current subscriber location information than the location information at HLR/AUC 145.

GMSC 155 is utilized to interface with PSTN 120. In order to setup a requested call, the call is initially routed to GMSC 155, which finds the correct home location register by knowing the directory number of the subscriber. GMSC 155 has an interface with an external network, such as PSTN 120, for gatewaying communications.

The elements of NSS 110 are connected using first network 160. First network 160 may comprise an intelligent network utilizing signal system 7 (SS7) protocol. SS7 is a global standard for telecommunications defined by the Telecommunication Standardization Sector of the International Telecommunication Union. The SS7 standard defines the procedures and protocol by which network elements in a public switched telephone network exchange information over a digital signaling network to effect wireless and wireline call setup, routing, and control.

Figure 2:
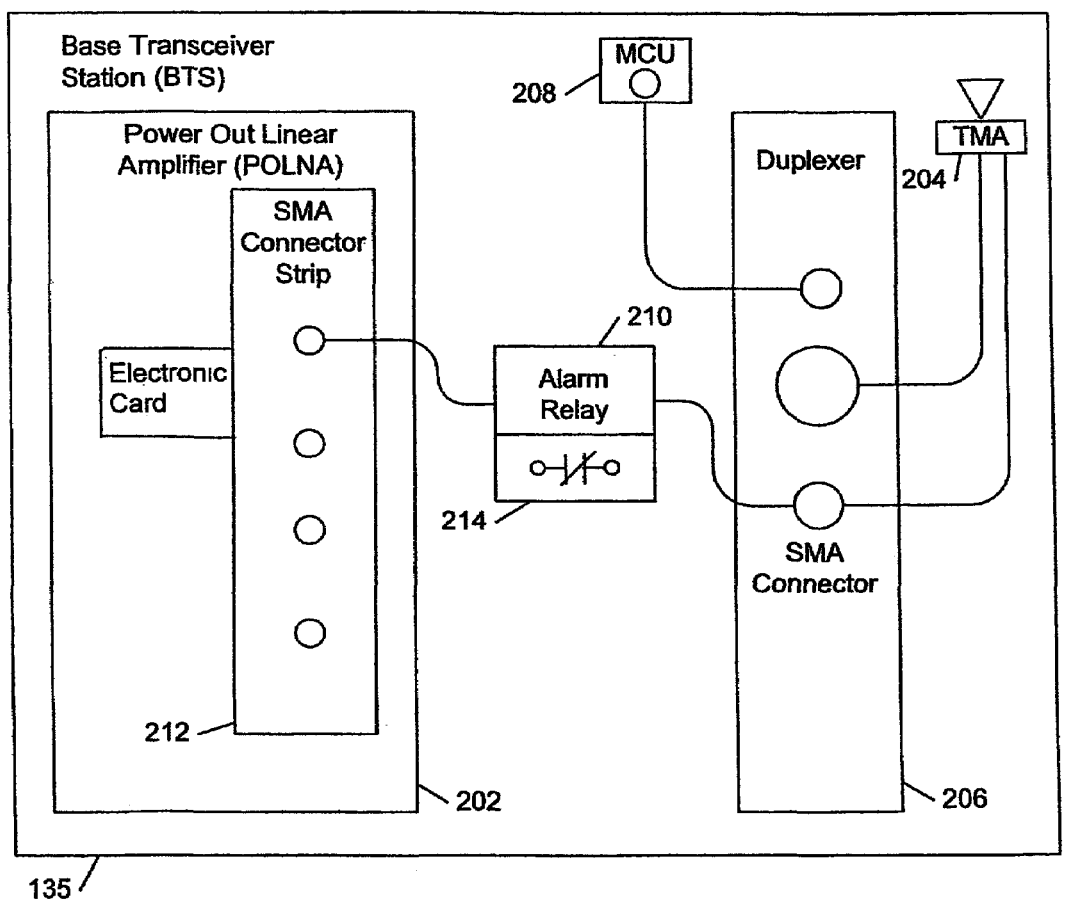
FIG. 2 is a diagram illustrating an exemplary voltage actuated device consistent with the principles of the present invention connected to the internal components of a base transceiver station.

In one embodiment, the present invention is located within base transceiver station (BTS) 135. FIG. 2 is a diagram illustrating an exemplary voltage actuated device connected to the internal components of BTS 135. More particularly, FIG. 2 illustrates that the power out linear amplifier (POLNA) 202 powers the tower mounted amplifier (TMA) 204 through duplexer 206. TMA 204 provides the function of increasing the signal strength received by the antenna when a user transmits a signal from mobile station (MS) 130. It increases the signal strength to the base station by approximately 15 decibels (db), and thus provides a much wider coverage range for users of BTS 135.

However, when POLNA 202 fails, TMA 204 may become disabled and the signal received by BTS 135 substantially degraded. For example, when POLNA 202 is operational and TMA 204 is powered, the signal received by BTS 135 may have a two mile diameter coverage area. But, when POLNA 202 fails and TMA 204 is de-energized, the signal coverage radius may drop to a half or a quarter of a mile.

FIG. 2 also illustrates a major coupling unit 208, which is in the transmit section of BTS 135 and does not pertain to TMA 204 per se, or anything in the receive section of BTS 135.

In addition to POLNA 202 providing voltage to TMA 204, POLNA 202 also provides an alarm function. In one embodiment, the alarm function is provided by an alarm relay 210, which is connected from SMA connector strip 212 of POLNA 202 to an SMA connector on duplexer 206. Duplexer 206 may be a passive device which provides filtering and connectivity for TMA 204.

In one embodiment, alarm relay 210 is a 15 volt relay with normally closed contacts, which is powered by 15 volts provided by POLNA 202. In this embodiment, normally closed contacts 214 are closed when no voltage is across alarm relay 210 and are powered open, during normal operation, with POLNA 202 powering TMA 204. While POLNA 202 is operative and the 15 volts is provided to alarm relay 210, normally closed contacts 214 of alarm relay 210 are open and no alarm indication is provided to the alarm monitoring components of telecommunication system 100. However, in the event that POLNA 202 is rendered inoperative and is no longer powering TMA 204, alarm relay 210 is de-energized and normally closed contacts 214 return to their normal state, and an alarm indication is provided to the alarm monitoring components of telecommunication system 100.

While normally closed contacts are illustrated as an exemplary embodiment, those skilled in the art will appreciate that a comparable design utilizing normally open contacts could be implemented.

Figure 3:
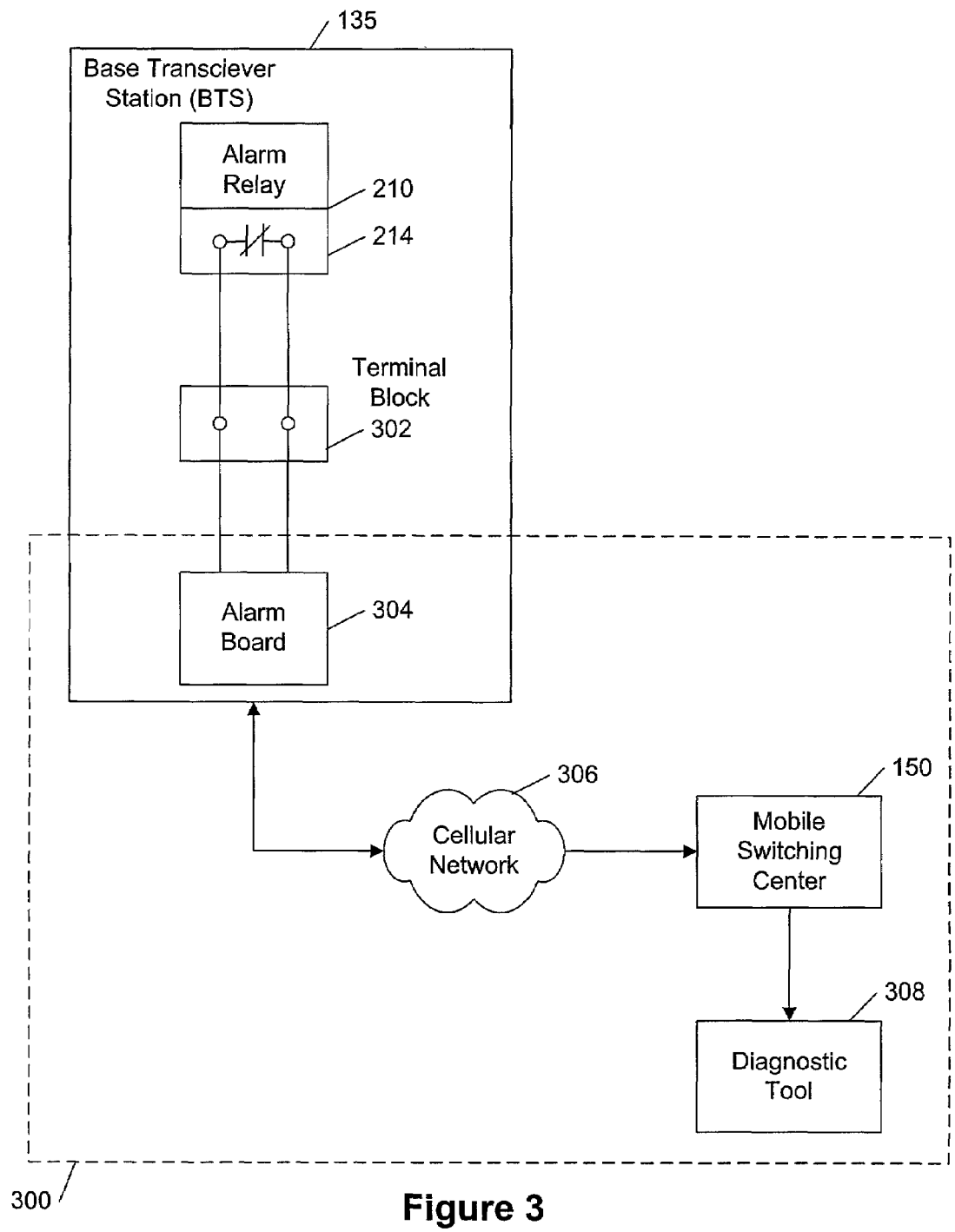
FIG. 3 is a diagram illustrating the connections between an exemplary voltage actuated device consistent with the principles of the present invention, within the base transceiver station, and the alarm monitoring components of the telecommunication system.

FIG. 3 illustrates the interface between alarm relay 210 and the alarm monitoring components 300 of telecommunication system 100. Specifically, FIG. 3 illustrates that normally closed contacts 214 are connected to terminal block 302 in the equipment receive section of BTS 135. Then, through terminal block 302, normally closed contacts 214 are connected to alarm board 304.

When an alarm condition exists (e.g., POLNA 202 is rendered inoperative and is no longer powering TMA 204), normally closed contacts 214 close and through terminal block 302 provide an input to alarm board 304. Alarm board 304 in turn may send an alarm indication, which may be in the form of an analog signal or digital signal, to mobile switching center (MSC) 150 via network 306. Within MSC 150, a script, which monitors alarm board 304, receives the alarm indication that POLNA 202 failed and the alarm is eventually detected by diagnostic tool 308. The alarm indication received by MSC 150 may be detected by diagnostic tool 308 through a polling routine. Diagnostic tool 308 may poll MSC 150 on a periodic basis and checks for received alarms and, if an alarm is detected, diagnostic tool 308 takes appropriate action based on the detected alarm.

Once diagnostic tool 308 detects the alarm indicating that POLNA 202 failed, it may forward a message indicating that POLNA 202 failed to a system attendant via, for example, a pager, a PDA, a cellular phone, or some other type of electronic message receiver/transmitter. The message forwarded by diagnostic tool 308 to the system attendant also indicates which BTS 135 contains the failed POLNA 202. The system attendant may then take the appropriate actions to repair the failed component and return POLNA 202 to its normal operating condition.

Figure 4:
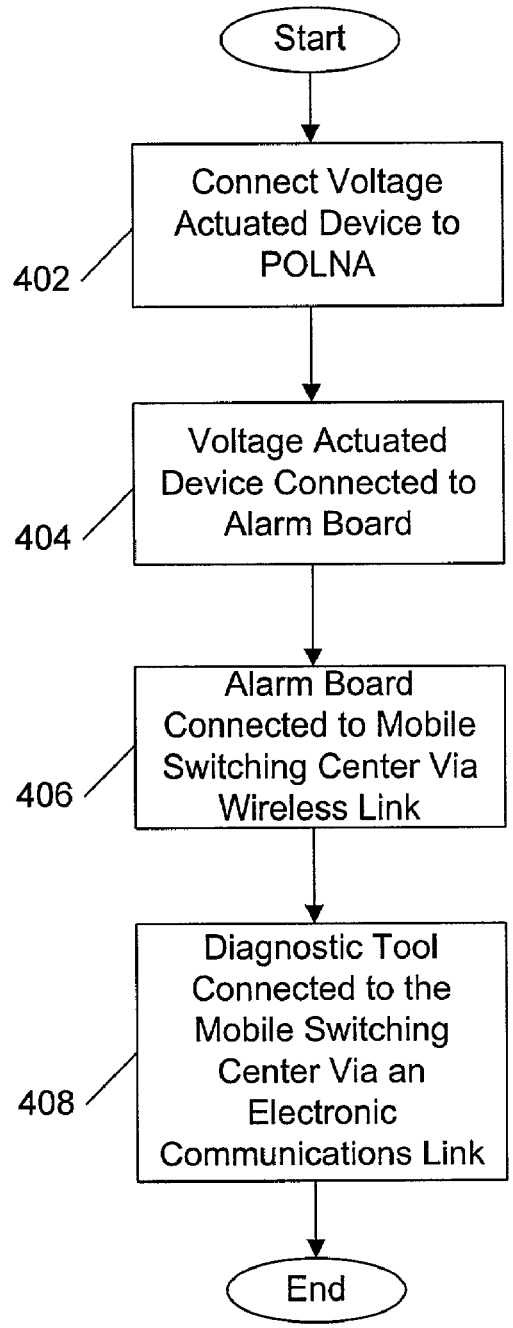
FIG. 4 is a flow chart illustrating an exemplary method consistent with the principles of the present invention for connecting an alarm indicator for a POLNA failure.

In another embodiment, the present invention provides a method for connecting an alarm indicator for a POLNA failure in a telecommunication system. In describing the methods that follow, the numbered components of the previously described figures will be used. FIG. 4 illustrates the steps for the method for connecting the alarm indicator. Method 400 begins by connecting a voltage actuated device (e.g., alarm relay 210) to a power out linear amplifier (Step 402). In one embodiment of the present invention, the voltage actuated device is connected between a 15 volt output of an electronic card in POLNA 202 and a connection on duplexer 206.

Next, the voltage actuated device's normally closed contacts 214 are connected to alarm board 304, which may be located within the base transceiver station in which POLNA 202 is located (Step 404). Then, alarm board 304 is connected to mobile switching station (MSC) 150 via cellular network 306 using, for example, FDMA, TDMA, CDMA, UMTS, EDGE, and CDMA2000 communications (Step 406). Finally, diagnostic tool 308 is connected to MSC 150 via an electronic communication link (Step 408). Diagnostic tool 308 is used to provide notification to a system attendant of a failure of POLNA 202.

Figure 5:
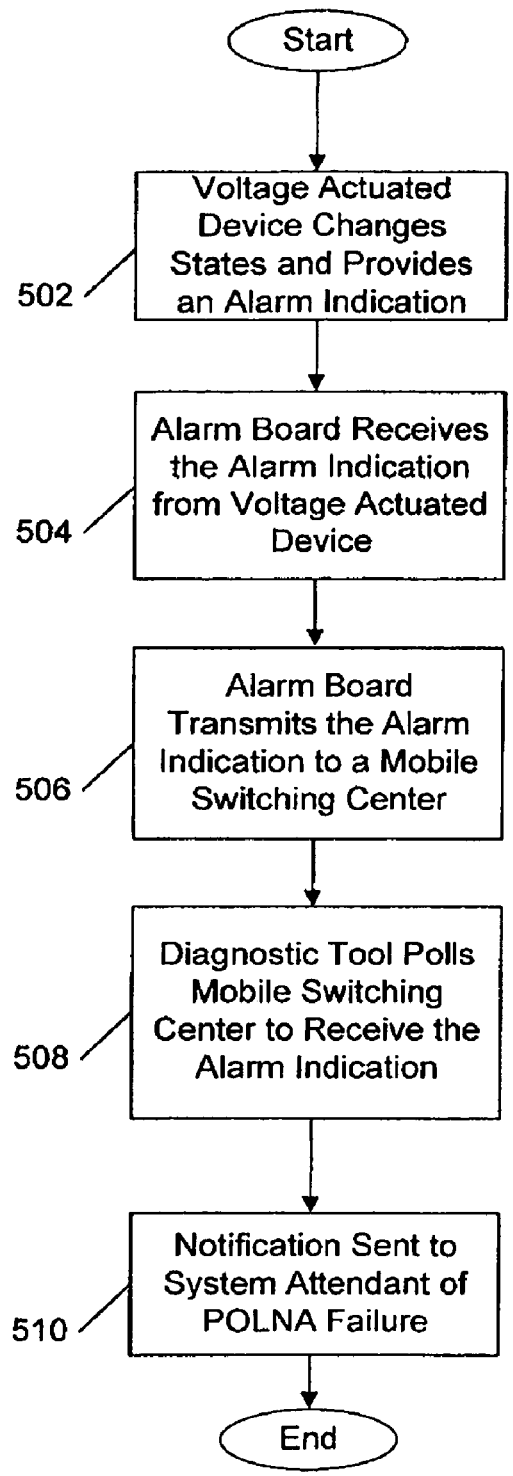
FIG. 5 is a flow chart illustrating an exemplary method consistent with the principles of the present invention for communicating an alarm for a POLNA failure.

In another embodiment, the present invention also provides a method for communicating and alarm for a POLNA failure. FIG. 5 illustrates the steps of the method. Method 500 begins with the voltage actuated device (e.g., alarm relay 210), which is connected to POLNA 202, changing states and providing an alarm indication (Step 502).

Next, alarm board 304, which may be located within the base transceiver station in which POLNA 202 is located, receives the alarm indication (Step 504). Then, alarm board 304 communicates the alarm indication to mobile switching station (MSC) 150 via a cellular network 306 using, for example, FDMA, TDMA, CDMA, UMTS, EDGE, and CDMA2000 communications (Step 506).

Finally, diagnostic tool 308 polls MSC 150 via an electronic communication link to receive the alarm indication (Step 508). Once diagnostic tool 308 receives the alarm indication, a notification is sent to a system attendant indicating that POLNA 202 has failed (Step 510).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system that provides alarm indication for a base transceiver station, comprising:

a base transceiver station including a power out linear amplifier (POLNA), a duplexer and a tower mounted amplifier (TMA); the power out linear amplifier providing voltage to the tower mounted amplifier, and having an electronic card in communication with the duplexer and the tower mounted amplifier;

a voltage actuated device, positioned between the power out linear amplifier and the duplexer, for sensing power failure of the electronic card in the power out linear amplifier; and an alarm board for sensing an alarm initiated from the voltage actuated device.

2. The system of claim 1, wherein the alarm board transfers the alarm to a mobile switching center.

3. The system of claim 2, wherein a diagnostic tool receives the alarm from the mobile switching center.

4. The system of claim 3, wherein the diagnostic tool receives the alarm and notifies a system attendant of the occurrence of the alarm.

5. The system of claim 4, wherein the system attendant is notified via one of a pager, a PDA, and a telephone communication device.

6. The system of claim 1, wherein the voltage actuated device is a relay.

7. A method of providing alarm indication for a base transceiver station including a power out linear amplifier (POLNA), a duplexer and a tower mounted amplifier (TMA); the power out linear amplifier providing voltage to the tower mounted amplifier, and having an electronic card in communication with the duplexer and the tower mounted amplifier, the method comprising:
- triggering a voltage actuated device, positioned between the power out linear amplifier and the duplexer, to provide an alarm upon a loss of power of the electronic card in the power out linear amplifier to the tower mounted amplifier; and
- providing the alarm from the voltage actuated device to an alarm board.

8. The method of claim 7, further comprising providing the alarm from the alarm board to a mobile switching center.

9. The method of claim 8, further comprising providing the alarm from the mobile switch center to a diagnostic tool.

10. The method of claim 9, further comprising providing the alarm from the diagnostic tool to a system attendant.

11. The method of claim 10, wherein providing the alarm to the system attendant includes using one of a pager, a PDA, and a telephone communication device.

12. The method of claim 7, wherein triggering the alarm further includes initiating a change of state in the voltage actuated device to generate the alarm.

13. A method of connecting an alarm for a base transceiver station including a power out linear amplifier (POLNA), a duplexer and a tower mounted amplifier (TMA); the power out linear amplifier providing voltage to the tower mounted amplifier, and including an electronic card in communication with the duplexer and the tower mounted amplifier, the method comprising:
- connecting a voltage actuated device, positioned between the power out linear amplifier and the duplexer, to the power out linear amplifier that senses failure of the electronic card in the power out linear amplifier;
- connecting the voltage actuated device to an alarm board;
- connecting the alarm board to a mobile switching center; and
- connecting the mobile switching center to a diagnostic tool.

14. The method of claim 13, wherein connecting the voltage actuated device includes connecting the voltage actuated device between the power out linear amplifier and a duplexer.

15. The method of claim 13, wherein connecting the alarm board includes connecting the alarm board to the mobile switching center via a cellular communication network.

16. The method of claim 13, wherein connecting the mobile switching center includes connecting the diagnostic tool via an electronic communication link, which allows the diagnostic tool to poll the mobile switching center.

17. A system that provides alarm indication for a base transceiver station, comprising:
- a base transceiver station including a power out linear amplifier (POLNA), a duplexer and a tower mounted amplifier (TMA); the power out linear amplifier providing voltage to the tower mounted amplifier, and having an electronic card in communication with the duplexer and the tower mounted amplifier;
- a voltage actuated device, positioned between the power out linear amplifier and the duplexer, for sensing a loss of power to the tower mounted amplifier when the electronic card in the power out linear amplifier fails; and
- an alarm board for sensing an alarm initiated from the voltage actuated device.

18. A method of providing alarm indication for a based transceiver station including a power out linear amplifier (POLNA), a duplexer and a tower mounted amplifier (TMA); the power out linear amplifier providing voltage to the tower mounted amplifier, and having an electronic card in communication with the duplexer and the tower mounted amplifier, the method comprising:
- triggering a voltage actuated device to provide an alarm upon a loss of power, due to a failure of the electronic card in the power out linear amplifier, to the tower mounted amplifier; and
- providing the alarm from the voltage actuated device to an alarm board.

19. A method of connecting an alarm for a power out linear amplifier (POLNA), a duplexer and a tower mounted amplifier (TMA); the power out linear amplifier providing voltage to the tower mounted amplifier, and having an electronic card in communication with the duplexer and the tower mounted amplifier, the method comprising:
- connecting a voltage actuated device, between the power out linear amplifier and the duplexer, that senses failure of the electronic card in the power out linear amplifier;
- connecting the voltage actuated device to an alarm board;
- connecting the alarm board to a mobile switching center;
- connecting the mobile switching center to a diagnostic tool; and
- initiating an alarm upon a loss of power from the power out linear amplifier to the voltage actuated device.

* * * * *